United States Patent Office 3,417,461
Patented Dec. 24, 1968

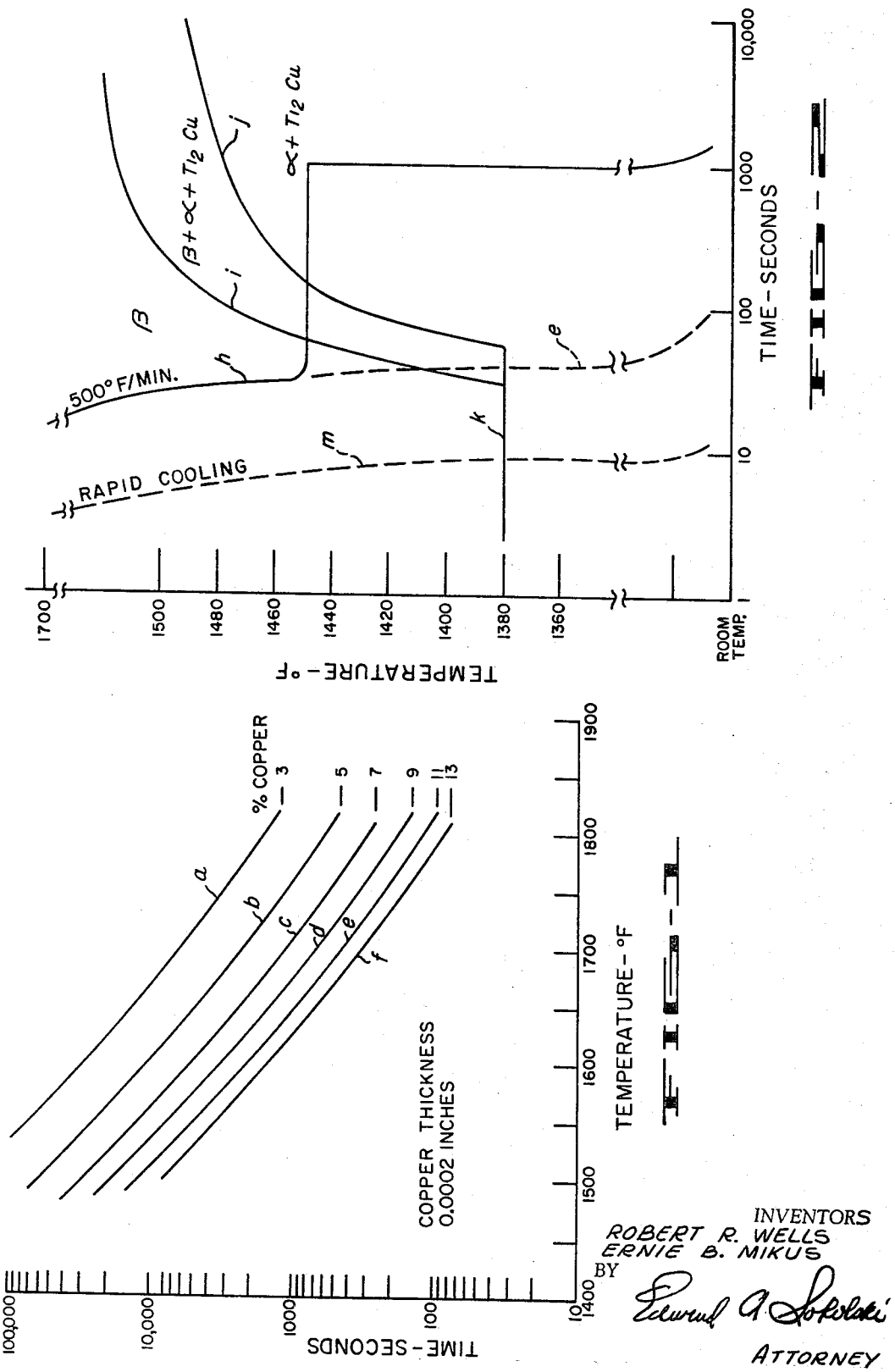

3,417,461
THIN-FILM DIFFUSION BRAZING OF TITANIUM MEMBERS UTILIZING COPPER INTERMEDIATES
Robert R. Wells, La Mirada, and Ernie B. Mikus, Los Alamitos, Calif., assignors to Northrop Corporation, Beverly Hills, Calif., a corporation of California
Filed Dec. 15, 1965, Ser. No. 513,936
14 Claims. (Cl. 29—487)

ABSTRACT OF THE DISCLOSURE

A method of bonding titanium or titanium alloys to each other comprising placing a thin layer of copper at the bond joint, heating the bond joint to a temperature sufficiently high to form a eutectic liquid of copper and titanium, and maintaining the bond joint at that temperature for a sufficient period of time to allow solid state diffusion of the copper and titanium atoms at the interface, and finally lowering the temperature of the bond joint to an intermediate temperature and holding it at that temperature for a period of time to effect a transformation of the joint material from a beta-titanium phase to an alpha-titanium phase plus $Ti_2Cu$.

---

This invention relates to the thin-film diffusion brazing of titanium members utilizing copper base intermediates and, more particularly, to a process for achieving such brazing involving the formation of a eutectic liquid, thus allowing liquid-state diffusion at a lower temperature as well as solid-state diffusion in achieving the desired end results.

In solid-state diffusion bonding, joinder is achieved by virtue of an exchange of atoms across the interface between two metals to be joined. In one type of such process, a thin layer of liquid metal is formed, at the joining temperature, between the surfaces to be joined, thus enhancing atomic exchange (diffusion) and overcoming significant degrees of mismatch between the surfaces to be joined. Thus, this process differs from solid-state diffusion bonding in that a liquid is formed during a portion of the joining cycle. In addition, this process differs from standard brazing in that extensive diffusion is desired between the solid and liquid portions of the joint, resulting in extensive compositional changes. In diffusion brazing of titanium members, it is highly desirable to lower the maximum temperature to which the titanium alloy need be subjected during joining by achieving liquification at the interface through the utilization of an intermediate metal which forms a eutectic alloy with the titanium. In the prior art, this has generally been accomplished by combining the titanium surfaces with an intermediate metal, such as nickel, which forms a titanium rich eutectic alloy, with the feeling that it will thus be easier to remove all of the intermediate-rich titanium phases by dissolving them in the eutectic liquid.

In utilizing an intermediate to form a eutectic liquid for diffusion brazing, several factors are to be considered: Firstly, it is desirable to select an intermediate which forms a eutectic alloy that has as low a melting point as possible. This is to minimize the temperature to which the titanium is subjected during joining, thus limiting the undesirable formation and subsequent growth of beta phase titanium in the alloy. Secondly, it is desirable to select an intermediate which will result in ductile joints by eliminating continuous interfaces of brittle compounds. Thirdly, it is desirable to restrict the amount of solid-state diffusion needed to achieve a satisfactory joint. Fourthly, it is desirable that the intermediate be soluble in the base alloy. Fifthly, a reliable method for placing a thin layer of the intermediate between the surfaces to be joined is needed.

In evaluating the possibilities of the various intermediates for use in thin-film diffusion brazing of titanium alloys, copper appears, at first glance, to offer some advantages in that it forms a eutectic alloy with titanium having a relatively low eutectic temperature (about 1630° F.) and requires relatively minor solid state diffusion prior to the formation of the first eutectic liquid due to the fact that the eutectic of interest involves an alloy having a high precentage of copper. This last factor, however, tends to discourage the use of copper in view of the fact that one skilled in the art would expect difficulty in diffusing away the high quantity of copper in the eutectic formed. Completely contrary to what would be expected, however, it has been found, after considerable experimentation, that while the original eutectic alloy formed is very rich in copper, that after diffusion in both the liquid and solid states has been completed, an extensive chemical change has occurred which reduces the copper content of the joint to a low value. It has also been found that a superior joint having improved ductility and thermal stability can be achieved by controlling the subsequent eutectoid transformation of the copper-bearing, high temperature beta structure (body centered cubic arrangement of atoms) titanium to alpha structure (hexagonal close packed arrangement of atoms) titanium plus $Ti_2Cu$. This end result is achieved by either slow cooling the beta titanium or by cooling to and holding the material at an intermediate temperature for a period of time to permit a second short range diffusion controlled transformation to occur. Thus, the process of this invention enables the formation of a superior bond between titanium members without going to high temperatures as heretofore required and without the necessity for high presures being applied to the members to be joined. During the joinder of solution treated and aged titanium alloys, the proper aging conditions are selected to provide joint ductility.

It is, therefore, an object of this invention to provide an improved process for thin-film diffusion brazing of titanium parts.

It is a further object of this invention to facilitate the thin-film diffusion brazing of deformable titanium components, such as in forming honeycomb sandwich structures by lessening the pressure required for such joining.

It is still another object of this invention to enable the thin film diffusion brazing of titanium members at lower temperatures than in prior art processes.

It is still another object of this invention to provide an improved process for diffusion brazing of titanium members in which the eutectoid transformation of the joint from a beta-titanium state to an alpha-titanium state is closely controlled to provide superior structural qualities.

Other objects of this invention will become apparent from the following description taken in connection with the accompanying drawings of which FIGURE 1 is a graph illustrating the time and temperature parameters which may be utilized in obtaining various percentages of copper in carrying out the process of the invention.

FIGURE 2 is a graph illustrating how temperature control is utilized in the process of the invention to achieve the desired eutectoid transformation from beta-phase to alpha-phase titanium.

In carrying out the process of the invention the titanium parts to be bonded together are first thoroughly cleaned. This is achieved by removing grease oils and other foreign particles then further cleaning either by lightly etching the surfaces with acid or by abrading such surfaces with cleanser and finally rinsing with water and air drying. A thin layer of copper is then placed between the surfaces of the titanium alloy parts to be joined. This layer may either be of pure copper or may be of a copper-based alloy, such as Cu-Ni, Cu-Be, or Cu-Ti. The layer may be applied either by electroplating, vacuum deposition, the application of copper powder, or the utilization of a thin sheet of wire screen. The copper layer utilized my average between .000001 and .003 inch in thickness and, preferably, averages between .00005 and .0002 inch in thickness with an average thickness of .00005 inch per surface being most preferred for honey-comb sandwich work. The members to be joined are then subjected to enough pressure to maintain position and alignment of the parts. With the parts in position, the joint region is then heated in a protective atmosphere, such as a vacuum or ultra-pure argon. The parts are heated to a temperature between 1600° F. and 2000° F. and held for a period of time at this temperature. The temperatures and times utilized vary with the titanium alloys involved and the thickness of the copper intermediate and, as to be explained in connection with FIGURE 1, the desired results can be achieved with various combinations of time and temperature. Solid-state diffusion of the copper and titanium atoms occurs as the temperature approaches 1630° F., with the resultant copper-titanium alloy entering the liquid state slightly above this temperature. The time which the joint is held at this temperature may vary anywhere between one minute and sixteen hours, depending on the titanium alloys used and the results desired; the usual range being between five minutes and two hours.

Finally, controlled transformation of the copper bearing beta-phase titanium is achieved by cooling the joint area at a rate of about 500° F./minute down to an intermediate temperature which may be between 1000° F. and 1600° F. and is usually between 1300° and 1500° F. The joint is held at this temperature anywhere between one and sixty minutes, with a preferred range being between five and twenty minutes. These specific temperature ranges and times vary with the particular titanium alloys utilized, with optimum transformation results having been achieved for Ti-8Al-1Mo-1V at 1450° F., for Ti-6Al-4V at 1350° F., and for Ti-75A between 1300° F. and 1475° F., for each of these alloys the temperature being maintained for fifteen minutes.

The above transformation treatment produces an annealed structure with the Ti-6Al-4V alloy. If it is desired to utilize the Ti-6Al-4V joinder in the solution treated and aged condition, then one must quench from the joining temperature and subsequently age. However, normal Ti-6Al-4V aging times and temperatures will embrittle the joints. Therefore, a compromise aging treatment of thirty minutes at 1350° F. is recommended.

Thus, it can be seen that variations in the basic process will occur, depending upon the titanium alloys to be bonded, the thickness of the intermediate copper layer involved, and the particular heating equipment available.

Referring to FIGURE 1, typical combinations of temperature and time for the diffusion during joining are illustrated. These parameters are shown for titanium bonding with a copper intermediate having a thickness of .0002 inch, with graph lines a–f representing the plots of time versus temperature for joints having percentages of copper of 3, 5, 7, 9, 11, and 13 percent, respectively. Thus, for example, by reference to this graph it can be seen that to obtain a final joint containing 7% copper which has been found to be desirable for most applications, the joint may be held either at 1700° F. for twenty minutes or at 1800° F. for five minutes. The particular combination of temperature and time will, of course, be determined by the heating equipment available, the operational speed requirements and the titanium alloy utilized. It is to be noted, however, that it is desirable in most instances to limit the maximum temperature to which the titanium parts are subjected to below a temperature which will result in either the formation of a substantial amount of beta-phase titanium, or of the beta-phase growth in the members to be joined.

Referring now to FIGURE 2, the transformation of the beta-phase titanium in the joint to alpha-phase titanium plus titanium compound ($Ti_2Cu$) is illustrated. Graph line $h$ illustrates the transformation which occurs in a joint of Ti-8Al-1Mo-1V with a final titanium copper alloy having 7% of copper therein. The area above and to the left of graph line $i$ represents the region in which the joint remains in the beta-titanium state; the area between graph lines $i$ and $j$ represents the area in which the joint will transform from beta-titanium to alpha-titanium plus $Ti_2Cu$; the area below the graph line indicated as $j$ represents the region where transformation to alpha-titanium plus titanium $Ti_2Cu$ is complete; while the area directly below graph line $k$ at 1380° F. indicates the region where the martensite formation begins to occur upon direct cooling without holding at an intermediate temperature.

As can be seen for the particular example involved, if the temperature of the joint is brought directly down to 1450° F. at a rate of 500° F. per minute and then held at this temperature for about fifteen minutes, the material will pass from the beta state through the beta+alpha +$Ti_2Cu$ state to the alpha+$Ti_2Cu$ state. It has been found that this type of controlled transformation at an elevated temperature produces an end product which is thermally stable and has a phase morphology that leads to improved ductility and strength. This is as contrasted with a rather brittle and thermally unstable joint when the parts are cooled down to ambient temperature directly at a rate of 500° F./minute as indicated by the dotted line extension $e$ of graph line $h$. It has been found that the joint material produced by such direct cooling comprises alpha'-titanium diffusionless transformation+alpha-titanium+$Ti_2Cu$. Dotted graph line $m$ indicates the transformation occurring with rapid cooling directly to room temperature. The resultant joint microstructure, in this case, has been found to be comprised of alpha'-titanium diffusionless transformation. It has been shown that the resultant martensitic product is brittle and is thermally unstable. When the diffusionless transformation is heated to a moderate temperature, a precipitation occurs therein which tends to further embrittle the joint. Thus, the ductile temperature stable end product resulting from the process of this invention offers a distinct improvement over products produced by the processes of the prior art.

Let us now look at several specific examples of the utilization of the process of the invention:

*Example I*

Both honeycomb sandwich structures and lap joints were fabricated of titanium alloy, Ti-75A, sold by Titanium Metals Corporation of America, which is comprised of maximum percentages of .08% C, .05% N, .015% H, .300% Fe and the balance being alpha-titanium as follows:

(1) The surfaces to be joined were thoroughly cleaned by removing grease and oil and other foreign matter and etching lightly with a solution of 49% $HNO_3$ plus 1% HF in water for one minute. The parts were then water rinsed and air dried.

(2) A layer of copper .0002 inch thick was then electroplated on one of the surfaces to be joined.

(3) The members to be joined were then placed in position for joining with the copper plated surface at the interface and held in such position by approximately ½-lb. per square inch pressure in a protective atmosphere of ultra-pure argon.

(4) With the members to be joined in the protective argon atmosphere, the joint was heated to 1700° F. and held at this temperature for 30 minutes.

(5) The joint was then allowed to cool to 1400° F. at a rate of 500° F./minute and held at this second temperature for 15 minutes.

(6) The joint was allowed to cool to room temperature.

*Example II*

The same process was followed as described for Example I, except that titanium alloy Ti-6Al-4V was utilized for the members to be joined and, in step No. 5, the joint was cooled to 1350° F. at a rate of 500° F./minute and held at this temperature for 15 minutes rather than the temperature indicated in Example I.

*Example III*

The same process was followed as for Example II, except that as an alternate to Step No. 5 of Example II, solution treated and aged joints were fabricated by water quenching from step No. 4 and then aging at 1350° F. for 30 minutes.

*Example IV*

The same procedure was followed as in Example I, except that titanium alloy Ti-8Al-1Mo-1V was utilized for the material to be bonded and, in step No. 5, the temperature was reduced to 1450° F. at a rate of 500° F./minute and held at this temperature for 15 minutes rather than the temperature indicated in Example I.

In each case, a joint was obtained having excellent strength, ductility, and temperature stability characteristics with copper content of about 7%. It is to be noted that good results can be achieved not only with pure copper but also with copper base alloys, such as, for example, Cu-Ni, Cu-Be, and Cu-Ti; the use of such alloys involving minor variations in the time-temperature parameters for pure copper. As indicated by the graphs, various combinations of time and temperature may be utilized to satisfy various production and end product requirements. It is important, however, to note that the temperature should be limited so as to minimize or prevent growth of beta-phase titanium in the titanium alloy. The control of the transformation from beta-titanium to alpha-titanium plus $Ti_2Cu$ is imperative if the resultant joint is to be thermally stable and possess good ductility.

The process of this invention thus provides a substantial improvement in the thin-film diffusion brazing of titanium members by the utilization of a copper intermediate and controlled transformation of the joint.

While the process of this invention has been described and illustrated in detail, it is to be clearly understood that this is intended by way of illustration and example only and is not to be taken by way of limitation; the spirit and scope of this invention being limited only by the terms of the following claims.

We claim:

1. A process for joining titanium members together comprising the steps of
   thoroughly cleaning the surfaces to be joined,
   placing a thin copper base layer of less than .003 inch thickness on at least one of the cleaned surfaces to be joined,
   placing the members together with the surfaces to be joined opposite each other with the copper base layer therebetween,
   subjecting the members to sufficient positive pressure to maintain position and alignment for joinder,
   while the members are being so held heating them in a protective atmosphere to a temperature of between 1600 and 2000 degrees F. and which is sufficiently high to form a eutectic liquid and holding the members at this temperature for a sufficient period of time to cause solid state diffusion of the copper and titanium atoms at the interface and the formation of a eutectic liquid at such interface, and
   lowering the temperature of the members to an intermediate temperature of between 1000 and 1600 degrees F. and holding said members at this temperature for a sufficient period of time to effect the complete transformation of the joint material from the beta-titanium phase to an alpha-titanium phase plus $Ti_2Cu$.

2. The process as recited in claim 1 wherein the temperature of the titanium members is lowered to an intermediate temperature of between 1300° F. and 1500 F.

3. The process as recited in claim 2 wherein the titanium members are held at the intermediate temperature for between 5 and 20 minutes.

4. The process as recited in claim 1 wherein the titanium members are of the alloy Ti-8Al-1Mo-IV and wherein the intermediate temperature to which said members is lowered is 1450° F., said members being held at this intermediate temperature for approximately 15 minutes.

5. The process as recited in claim 1 wherein the titanium members are of the alloy ti-6Al-4V and wherein the intermediate temperature to which said alloy is lowered is 1350° F., said members being held at this intermediate temperature for approximately 15 minutes.

6. The process as recited in claim 1 wherein the titanium members are an alpha-titanium alloy and wherein the intermediate temperature to which said members are lowered is between 1300° F. and 1475° F., said members being held at this intermediate temperature for approximately 15 minutes.

7. The process as recited in claim 2 wherein the members are cooled to the intermediate temperature at a rate of approximately 500° F./minute.

8. The process as recited in claim 1 wherein the copper base layer between said members is between .000001 and .0003 inch in thickness.

9. The process as recited in claim 1 wherein the copper base layer is between .00004–.0002 inch in thickness and the members are heated to a temperature of about 1700° F. and held at this temperature for approximately 20 minutes.

10. The process as recited in claim 9 wherein the intermediate temperature to which said members are lowered is between 1300° F. and 1500° F., said members being held at the intermediate temperature for approximately 15 minutes.

11. The process as recited in claim 10 wherein said members are cooled to the intermediate temperature at the rate of 500° F./minute.

12. A process for bonding together titanium members comprising the steps of
    placing a thin copper base layer of less than .003 inch thickness on the surface to be joined to one of the members,
    placing said members together with the surfaces to be joined facing each other with the copper base layer therebetween,
    while said members are being subjected to sufficient pressure to maintain position and alignment and good surface contact therebetween, heating said members in a protective atmosphere to a temperature of between 1600 and 2000 degrees F. and which is sufficiently high to form a eutectic liquid and holding said members at this temperature for a sufficient period of time to achieve solid state diffusion at the interface thereof and the formation of a eutectic liquid, and
    lowering the temperature of said members to cause a substantially complete transformation of the copper containing titanium from the beta to the alpha phase plus $Ti_2Cu$, 13. The process as recited in claim 12 wherein the temperature of the members is lowered to an intermediate temperature of between 1300° F. and 1500° F. and held at this temperature for approximately 15 minutes to cause said transformation of the copper containing titanium from the beta phase to the alpha phase plus $Ti_2Cu$.

14. A process for bonding together titanium members comprising the steps of placing a thin copper base layer of less than .003 inch thickness on the surface to be joined to one of the members, placing said members together with the surafces to be joined facing each other with the copper base layer therebetween, while said members are being subjected to sufficient pressure to maintain position and alignment and good surface contact therebetween, heating said members in a protective atmosphere to a temperature of between 1600 and 2000 degrees F. and which is sufficiently high to form a eutectic liquid and holding said members at this temperature for a sufficient period of time to achieve solid state diffusion at the surface thereof and the formation of a eutectic liquid, and rapidly cooling said members forming a diffusionless transformation in the joint and subsequently aging said joint to cause a substantially complete transformation from the beta to the alpha phase plus $Ti_2Cu$.

References Cited

UNITED STATES PATENTS

| | | |
|---|---|---|
| 2,512,455 | 6/1950 | Alexander. |
| 2,847,302 | 8/1958 | Long _____ 29—504 X |
| 2,857,663 | 10/1958 | Beggs _____ 29—494 X |
| 2,859,512 | 11/1958 | Dijksterhuis _____ 29—494 X |
| 2,906,008 | 9/1959 | Boegehold _____ 29—501 X |
| 3,106,773 | 10/1963 | Jaffe _____ 29—487 |
| 3,302,282 | 2/1967 | Vordahl _____ 29—504 X |

FOREIGN PATENTS

| | | |
|---|---|---|
| 367,710 | 1961 | Japan. |
| 662,977 | 5/1963 | Canada. |
| 833,758 | 4/1960 | Great Britain. |

OTHER REFERENCES

Constitution of binary alloys, Hansen, McGraw-Hill Book Company, 1958, pp. 643, 656 and 1050, Cu-Ti phase diagram, Cu-Zr phase diagram, Ni-Ti phase diagram.

Physical Metallurgy, by Chalmers, copyright 1959, John Wiley & Sons, pp. 368–369.

Properties of Timet, Titanium Mill Products, Titanium Metals Corporation of America, pp. D–1 through D–16.

JOHN F. CAMPBELL, *Primary Examiner.*

R. F. DROPKIN, *Assistant Examiner.*

U.S. Cl. X.R.

29—198, 494, 498, 501, 504